United States Patent [19]
Jost

[11] 4,206,979
[45] Jun. 10, 1980

[54] ELECTRO-OPTIC MODULATOR

[75] Inventor: Steven R. Jost, Cranbury, N.J.

[73] Assignee: Grumman Aerospace Corporation, Bethpage, N.Y.

[21] Appl. No.: 919,471

[22] Filed: Jun. 27, 1978

Related U.S. Application Data

[63] Continuation-in-part of Ser. No. 781,690, Mar. 28, 1977, abandoned.

[51] Int. Cl.² ............................................. G02F 1/13
[52] U.S. Cl. ......................................... 350/342; 357/30
[58] Field of Search ........................... 350/342; 357/30

[56] References Cited

U.S. PATENT DOCUMENTS

| 3,795,517 | 5/1974 | Sutton | 350/342 X |
| 3,976,361 | 8/1976 | Fraas et al. | 350/342 |
| 4,032,954 | 6/1977 | Grinberg et al. | 350/342 X |

Primary Examiner—Edward S. Bauer
Attorney, Agent, or Firm—Bruce B. Brunda; Richard G. Geib

[57] ABSTRACT

A multi-heterojunction of one type of photoconductive layer with another type of photoconductive layer to provide back-to-back modulators using illumination to decrease a potential barrier for current flow and increase voltage drop across an electro-optic device therewith associated in reproduction of an image thereby.

3 Claims, 1 Drawing Figure

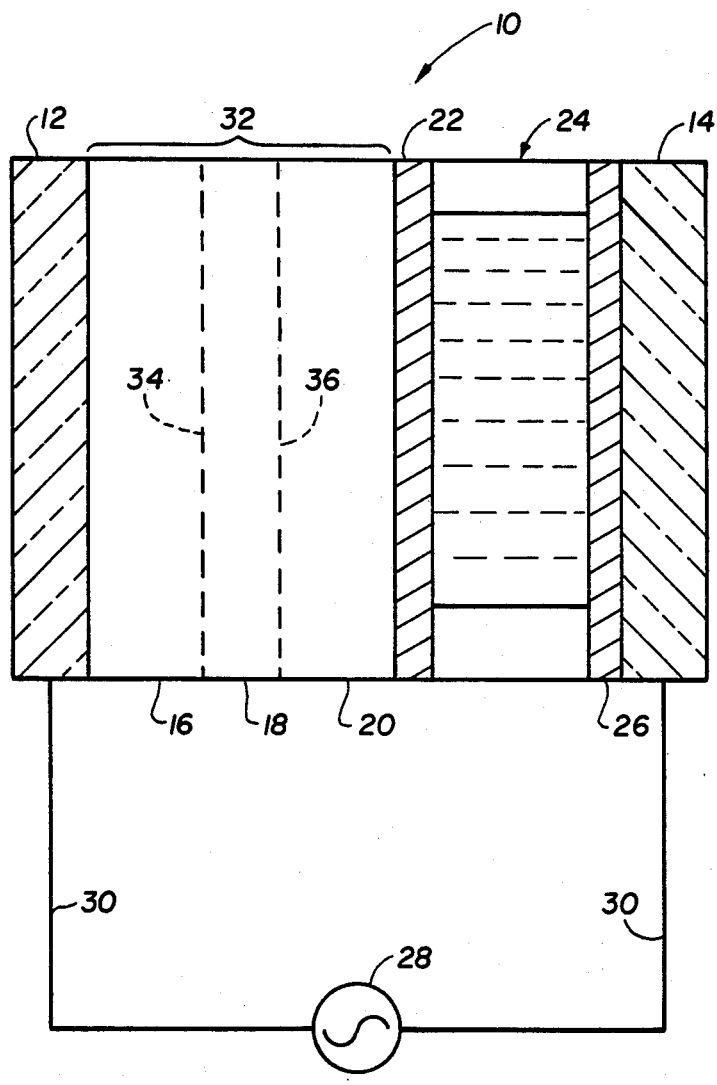

ELECTRO-OPTIC MODULATOR

CROSS REFERENCE

This application is a continuation-in-part of Applicant's previous application Ser. No. 781,690, filed Mar. 28, 1977, now abandoned.

BACKGROUND

As stated in U.S. Pat. No. 3,795,517, this invention relates to an electro-optic display device which is improved in reference thereto by the use of multiple heterojunctions of photoconductive layers as to allow high speed reproduction of image on a display such as a liquid crystal.

The prior art shows that one may be using both photoconductive and liquid crystal materials produce an image by projecting light thereon when pulsing with a voltage applied to transparent electrodes connected to said materials. As stated in the aforesaid patent and summarized in U.S. Pat. No. 3,824,002 in reference thereto such structure is to switch the voltage that drives it from the photoconductive material to the liquid crystal material under command of a light source.

In such prior art devices, the photoconductive layer ranged between 1 to 25 microns and had a resistance of about $10^{10}$ ohms-centimeters. This layer was then controlled by a light source in that the amount of illumination directed onto such a photoconductive layer determined the amount of current flowing through it between the electrodes. In other words, by becoming selectively conductive, a photoconductor can control the excitation of an electro-optic device. Typically, the prior art uses of such structures was to create a conductivity image corresponding to images created by almost any form of light energy radiated thereto.

It is in the improvement of these prior art devices that this invention finds utility.

DRAWING DESCRIPTION

The drawing presents a schematic sectional view of an electro-optic element of the invention.

DETAILED DESCRIPTION

In the drawing, a typical liquid crystalline imaging device 10, sometimes referred to in the art as an electro-optical element, is shown in cross section wherein a pair of transparent electrodes 12 and 14 sandwich photoconductive elements 16, 18 and 20. Alignment layers 22 and 26 are adjacent to liquid crystal layer 24 with its accompanying spacer seals.

As indicated, this invention makes it possible to use the preferred form of device having transparent electrodes so that one can use transmitted light to view an image.

A field is created between the electrodes by electrically connecting the electrodes to an AC source of potential 28 through leads 30.

While as above-referenced, the prior art has used photoconductive structures to comprise a capacitive modulation of the potential through the liquid crystal layer, nothing has been disclosed by the prior art which indicates that one could provide variable peak to peak control with the use of a multiple heterojunction such as double junction photoconductor layer 32 comprising polycrystalline photoconductor material for elements 16 and 20 with a junction activation material interposed, element 18. Actually, there could be as many as six such junctions according to results obtained in constructions to date. This being, of course, in refinement of capacitive modulation features by a single heterojunction in that more or less light varies the potential barrier for current flow so that one can control practically, in the structure, the voltage drop across electro-optic display 24 for refined control of its optical properties such as reflection, birefringence, circular dischroism, optical rotation and, if desired with an appropriate liquid crystal, color within the electrical field of the device 10.

By way of a particular example where a device such as the present invention has been found to have utility, is the system depicted by U.S. Pat. No. 3,779,492 assigned to the common assignee of this invention. In the device built for such system, glass coated with indium tin oxide has been employed for transparent electrodes 12 and 14; cadmium sulfide for photoconductor materials in elements 16 and 20 adjacent to element 18 composed of CdS:Cu as to create junctions 34 and 36; the electro-optic display was a liquid crystal of the twisted Nematic type; and alignment layers 22 and 26 were magnesium fluoride laid at a partial angle from 60°–90° to surface. Another type of alignment material would be silicon monoxide.

Cadmium sulfide crystals are known in the art to be either n-type or insulating, the insulating crystals being the result of nearly perfect compensation of donors and acceptors. Typically, the presence of excess cadmium in the CdS layers produces n-type conductivity in this material.

Also well known in the art is that the addition of copper ions to a region of CdS crystals will affect a change within the region to p-type conductivity. In the field, the addition of more than one percent of a dopant to a semiconducting layer is considered to alter the conductive characteristics of the material to such an extent as to establish a heterogeneous relationship between doped and undoped layers of the material. The concentration of copper in the p-type semiconducting layer is in accordance with this convention.

The use of an AC source in conjunction with the aforementioned heterogeneous semiconducting layers serves to create charges within the semiconductors which causes a variation in the depletion layer in response to the applied voltage. Since a discrete time period is required to sweep these charges from the junction region, a high frequency source will not permit sufficient time to forward bias the junction during each cycle of the applied voltage, therefore, the junction remains essentially in reverse bias.

Single heterojunction systems which esentially remain reversed biased during operation are disclosed in U.S. Pat. Nos. 4,032,954 and 3,976,361.

The present invention discloses the use of a multiple heterojunction device which insures that at least one junction is well into reverse bias condition even at lower frequencies, therefore allowing greater photomodulation and consequently higher resolution of the ultimate image produced at the liquid crystal display.

One advantage of using CdS:Cu for the p-type layers of the invention is that since this material is essentially transparent to red light, as known to one skilled in the art, it allows system compatibility with red light characteristic of a laser light source. This compatibility coupled with the aforementioned advantages of a multiple heterojunction provides a high resolution system which can spatially modulate laser energy.

In constructing the aforesaid, cadmium sulfide was deposited on the indium tin oxide glass electrode 12 to a thickness of approximately 25,000 A. Thereafter, this structure was heated within an inert atmosphere, such as nitrogen, to crystallize the layer 16 at a temperature of 520° for 15 minutes. Then layers 18 and 20 were produced by first depositing copper on the crystalline photoconductor to a thickness of approximately 50 A. Immediately thereafter a second layer of cadmium sulfide was deposited on the copper junction activation material.

After deposition of the copper and cadmium sulfide, the structure of electrode 12 and elements 16, 18 and 20 was heat treated at 600° C. for 7 minutes in a nitrogen atmosphere. Thereafter, the standard techniques of forming the liquid crystal 24 with both spacer seals and adjacent alignment layers 22 and 26. The alignment layers may be either magnesium fluoride or silicon monoxide. Transparent electrode 14 is adhered thereover to complete the electro-optic package 10.

By appropriate control of heat and soak time at any particular temperature, one can obtain either an asymmetric or symmetric double heterojunction. It is this feature that allows one to control the peak-to-peak range of electrical excitation in capacitive modulation of the liquid crystal in accordance with an image projected on the photoconductor 32 by a light source. This image is then reproduced and viewable by state of the art means; i.e., by crossed polarizers.

As one skilled in the art will recognize, layer 18 could alternatively be produced by co-depositing copper and cadmium sulfide on the crystalline substrate using ion vapor deposition techniques as disclosed in an article in Solid State Electronic (Gr. Br.) 1975, Vol. 18, pp. 839–844.

Having described an operative construction, the claims for these Letters Patent may now be set forth.

What is claimed is:

1. In a transmissive electro-optical element comprised of an electro-optic film between alignment layers and a photoconductive layer located between a pair of transparent electrodes, the improvement wherein the photoconductive layer includes multiple n-type CdS photoconductors with a p-type CdS:Cu photoconductor therebetween.

2. A transmissive incoherent to coherent image producer comprising:
   multiple heterojunction means including two n-type CdS photoconductor layers sandwiching a CdS:Cu photoconductor layer of p-type conductivity type;
   transparent conductive electrodes, one of which is directly connected to the multiple heterojunction means and another of which is spaced therefrom;
   electro-optic material in the space between the multiple heterojunction means and said another of said transparent conductive electrodes; and
   means to generate a signal connected across said transparent electrodes.

3. A method of producing a light controlled AC electro-optic modulator, said method including the steps of manufacture of a multiple heterojunction comprising:
   depositing a first layer of CdS photoconductive material of P-type conductivity on a transparent electrode;
   heat treating said electrode with its deposited layer at a predetermined temperature to an inert atmosphere to crystallize said first layer of CdS;
   depositing a thin layer of copper on the first photoconductor material;
   depositing a second layer of CdS photoconductor material on said copper layer; and
   heat treating the aforesaid at a predetermined temperature in an inert atmosphere to make a multiple heterojunction structure of two n-type CdS layers sandwiching a layer of p-type CdS:Cu.

* * * * *

UNITED STATES PATENT AND TRADEMARK OFFICE
CERTIFICATE OF CORRECTION

PATENT NO. : 4,206,979
DATED : June 10, 1980
INVENTOR(S) : Steven R. Jost

It is certified that error appears in the above-identified patent and that said Letters Patent are hereby corrected as shown below:

Claim 2; Line 5, delete "type" second occurrence.

Claim 3; Line 9, delete "to" and insert therefor --- in ---.

Signed and Sealed this

Fourteenth Day of October 1980

[SEAL]

Attest:

SIDNEY A. DIAMOND

Attesting Officer          Commissioner of Patents and Trademarks